United States Patent
Gilmartin et al.

(10) Patent No.: US 8,695,783 B2
(45) Date of Patent: Apr. 15, 2014

(54) VACUUM TRANSPORT BELTS

(75) Inventors: Brian P. Gilmartin, Williamsville, NY (US); Liang-Bih Lin, Rochester, NY (US)

(73) Assignee: Xerox Corporation, Norwalk, CT (US)

(*) Notice: Subject to any disclaimer, the term of this patent is extended or adjusted under 35 U.S.C. 154(b) by 362 days.

(21) Appl. No.: 12/709,671

(22) Filed: Feb. 22, 2010

(65) Prior Publication Data

US 2011/0139584 A1 Jun. 16, 2011

Related U.S. Application Data

(63) Continuation-in-part of application No. 12/636,889, filed on Dec. 14, 2009, and a continuation-in-part of application No. 12/637,218, filed on Dec. 14, 2009.

(51) Int. Cl.
*B65G 17/46* (2006.01)
*B65G 21/20* (2006.01)

(52) U.S. Cl.
CPC .................. *B65G 21/2036* (2013.01)
USPC ..................... 198/689.1; 198/844.1

(58) Field of Classification Search
USPC ........ 198/689.1, 471.1, 811, 844.2, 846, 847; 406/78
See application file for complete search history.

(56) References Cited

U.S. PATENT DOCUMENTS

| | | | |
|---|---|---|---|
| 2,555,319 A * | 6/1951 | Cross ............................ 101/420 |
| 3,519,819 A * | 7/1970 | Gramza et al. .................. 430/50 |
| 3,605,194 A * | 9/1971 | Nauta ............................ 425/471 |
| 3,787,229 A * | 1/1974 | Rudness ........................ 428/148 |
| 3,935,365 A * | 1/1976 | Eigenmann .................... 428/323 |
| 4,294,539 A | 10/1981 | Spehrley, Jr. |
| 4,294,540 A | 10/1981 | Thettu |
| 4,295,737 A | 10/1981 | Silverberg |
| 4,298,277 A | 11/1981 | Silverberg |
| 4,440,492 A | 4/1984 | Howard |
| 4,678,176 A | 7/1987 | Roller |
| 4,688,784 A * | 8/1987 | Wirz ............................. 271/195 |
| 4,747,992 A * | 5/1988 | Sypula et al. ................. 264/130 |
| 4,903,074 A | 2/1990 | Lama et al. |
| 4,922,304 A * | 5/1990 | Gilbert et al. ................. 399/322 |
| 4,946,028 A | 8/1990 | Eichmann et al. |
| 5,116,035 A | 5/1992 | Russel et al. |
| 5,139,253 A | 8/1992 | Bohme et al. |
| 5,423,255 A | 6/1995 | Maass |
| 5,620,176 A | 4/1997 | Spoorenberg et al. |

(Continued)

*Primary Examiner* — William R Harp
(74) *Attorney, Agent, or Firm* — MH2 Technology Law Group LLP

(57) ABSTRACT

Provided are media vacuum transport systems including media vacuum transport members, methods of making media vacuum transport members, and method of transporting media. In accordance with various embodiments, there is a media vacuum transport system including a vacuum plenum one or more transport members configured to rotate around the vacuum plenum and wherein at least one of the one or more transport members can include a substrate, the substrate comprising a plurality of holes extending from a first side proximate to the vacuum plenum to a second side opposite the first side, and a top coat layer disposed over the substrate, wherein the top coat layer can include a plurality of particles dispersed in a polymer blend to provide an average surface roughness Ra of about 2 μm to about 100 μm.

21 Claims, 11 Drawing Sheets

(56) References Cited

U.S. PATENT DOCUMENTS

| | | |
|---|---|---|
| 6,425,580 B1 | 7/2002 | Yandeda |
| 6,681,094 B2 | 1/2004 | Horrall et al. |
| 6,811,863 B2 * | 11/2004 | Rizika et al. ............... 428/304.4 |
| 6,970,672 B2 | 11/2005 | MacMillan et al. |
| 7,258,336 B2 | 8/2007 | Moore et al. |
| 7,922,174 B2 | 4/2011 | Panides et al. |
| 2010/0239764 A1 | 9/2010 | Ichizawa et al. |
| 2010/0298079 A1 * | 11/2010 | Shiriike et al. ............... 474/238 |

* cited by examiner

VACUUM TRANSPORT BELTS

CROSS REFERENCE TO RELATED APPLICATION

This application is a continuation-in-part of U.S. patent application Ser. Nos. 12/636,889 and 12/637,218, both of which were filed on Dec. 14, 2009 from which priority is claimed, the disclosures of which are hereby incorporated by reference in their entirety.

FIELD OF USE

The present teachings relate generally to printing devices and, more particularly, to media vacuum transport systems.

BACKGROUND

In direct marking systems, the media is held down flat while being printed and hence, media flatness is critical. Usually media is held down by vacuum and transported using media vacuum-transport systems. A typical media vacuum-transport system includes a belt which can be rotated around a vacuum plenum. The belt includes a plurality of holes and it is through the plurality of holes that a vacuum is applied and the media is held down by the vacuum. The interface of the media and the plurality of holes is an important parameter as it has a significant influence on other key vacuum force factors—such as blower size, hole pitch, hole diameter, total flow, etc. One of the disadvantages of conventional media vacuum-transport systems is that they normally employ smooth surfaces on belts, drums, etc., which creates a "sealing-off" effect, thus limiting the applied vacuum force to the area of the belt-holes only. As a result of the localized force application, transport systems have to use oversized blowers, large belt-holes, and inefficient patterns.

Hence, there is a need for a new method for enhancing vacuum pressure distribution for improved media hold down performance in a vacuum transport system.

SUMMARY

In accordance with various embodiments, there is a media vacuum transport system including a vacuum plenum one or more transport members configured to rotate around the vacuum plenum and wherein at least one of the one or more transport members can include a substrate, the substrate including a plurality of holes extending from a first side proximate to the vacuum plenum to a second side opposite the first side, and a top coat layer disposed over the substrate, the top coat layer including a plurality of particles dispersed in a polymer blend, the polymer blend comprising two or more polymers selected from the group consisting of ethylene-vinyl acetate copolymer, styrene-butadiene copolymer, polyethylene, polyvinyl chloride, polyvinylidene chloride, polyoxymethylene, polypropylene, polybutylene, polycarbonate, polyester, polyarylate, terephthalic acid resin, and the like, wherein the top coat layer can have an average surface roughness Ra of about 2 µm to about 100 µm.

According to another embodiment, there is a method of making a media vacuum transport member. The method can include providing a substrate, the substrate including a first side proximate to a vacuum plenum and a second side opposite the first side and providing a dispersion including a plurality of particles, one or more solvents, and two or more polymers selected from the group consisting of ethylene-vinyl acetate copolymer, styrene-butadiene copolymer, polyethylene, polyvinyl chloride, polyvinylidene chloride, polyoxymethylene, polypropylene, polybutylene, polycarbonate, polyester, polyarylate, terephthalic acid resin, and the like. The method can also include applying the dispersion over the second side of the substrate to form a coated substrate and heating the coated substrate to form a top coat layer over the second side of the substrate, wherein the top coat layer can provide an average surface roughness Ra of about 2 µm to about 100 µm. The method can further include forming a plurality of holes extending from the first side of the substrate to the second side of the substrate.

According to yet another embodiment, there is a method of transporting media. The method can include providing one or more transport members configured to rotate around a vacuum plenum, wherein at least one of the one or more transport members can include a substrate, the substrate including a plurality of holes extending from a first side proximate to the vacuum plenum to a second side proximate to a media and a top coat layer disposed over the substrate, wherein the top coat layer can include a plurality of particles dispersed in a polymer blend, the polymer blend comprising two or more polymers selected from the group consisting of ethylene-vinyl acetate copolymer, styrene-butadiene copolymer, polyethylene, polyvinyl chloride, polyvinylidene chloride, polyoxymethylene, polypropylene, polybutylene, polycarbonate, polyester, polyarylate, terephthalic acid resin, and the like, and wherein the top coat layer can have an average surface roughness Ra of about 2 µm to about 100 µm. The method can also include disposing the media over the top coat layer of the one or more transport members and holding onto the media by applying vacuum through the holes of the substrate to generate a suction force, wherein the textured surface can distribute the suction force substantially uniformly between the textured surface of the top coat layer and the media. The method can also include transporting the media by rotating the one or more transport members around the vacuum plenum.

It is to be understood that both the foregoing general description and the following detailed description are exemplary and explanatory only and are not restrictive of the present teachings, as claimed.

The accompanying drawings, which are incorporated in and constitute a part of this specification, illustrate embodiments of the present teachings and together with the description, serve to explain the principles of the present teachings.

It should be noted that some details of the figures have been simplified and are drawn to facilitate understanding of the embodiments rather than to maintain strict structural accuracy, detail, and scale.

DESCRIPTION OF THE EMBODIMENTS

Reference will now be made in detail to the present embodiments, examples of which are illustrated in the accompanying drawings. Wherever possible, the same reference numbers will be used throughout the drawings to refer to the same or like parts.

In the following description, reference is made to the accompanying drawings that form a part thereof, and which are shown by way of illustration specific exemplary embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely exemplary.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less that 10" can assume negative values, e.g. −1, −2, −3, −10, −20, −30, etc.

Figure 1:
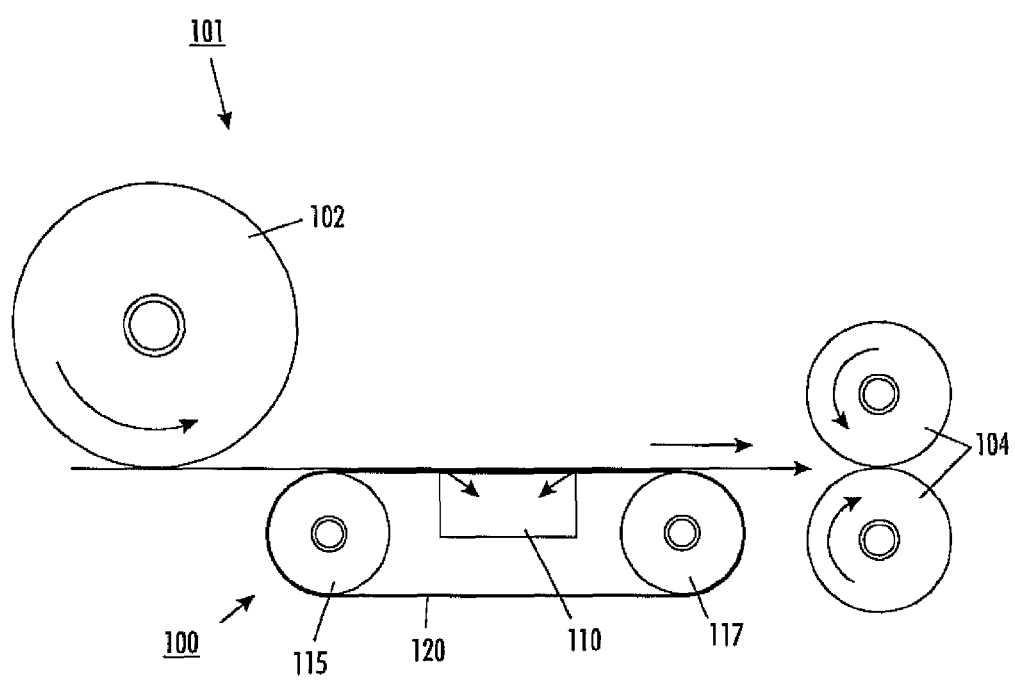
FIG. 1 schematically illustrates an exemplary media vacuum transport system in a portion of a printing apparatus, according to various embodiments of the present teachings.

In many designs of copiers or printers, particularly of the high-speed variety, the preferred device for moving a sheet from the photoreceptor to the fuser is a vacuum transport system. FIG. 1 schematically illustrates an exemplary media vacuum transport system 100 in a portion of a printing apparatus 101. As shown in FIG. 1, the vacuum transport system 100 can be disposed within a copier or printer between a photoreceptor 102 and fuser rolls 104. According to various embodiments, the media vacuum transport system 100 can include a vacuum plenum 110 and one or more transport members 120 configured to rotate around the vacuum plenum 110. In some embodiments, the one or more transport members 120 can include a belt 120 which can be entrained about two or more rollers 115, 117, as shown in FIG. 1.

Figure 2A:
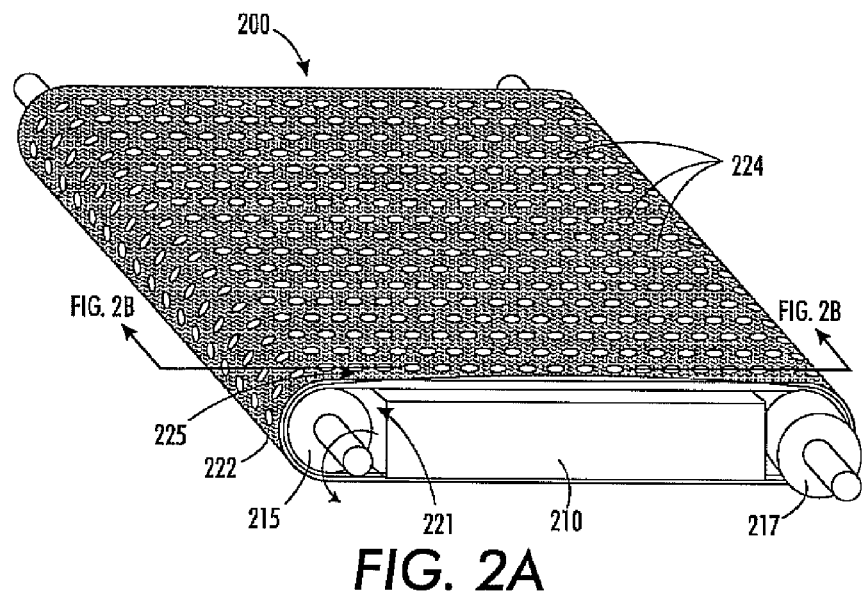
FIG. 2A is an isometric view of the exemplary media vacuum transport system shown in FIG. 1, according to various embodiments of the present teachings.
Figure 2B:
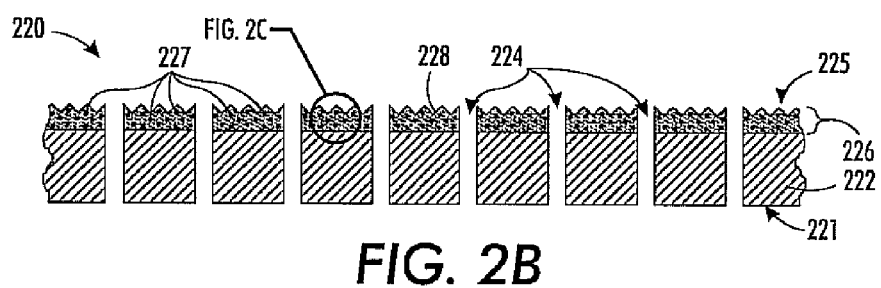
FIG. 2B schematically illustrates a cross section of an exemplary transport member shown in FIG. 2A, according to various embodiments of the present teachings.
Figure 2C:
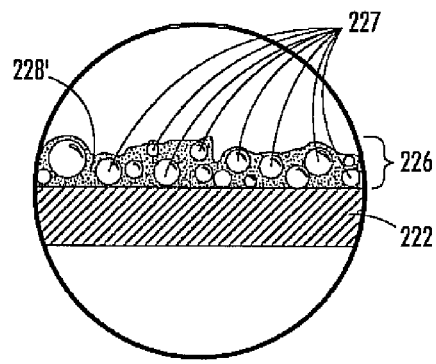
FIG. 2C schematically illustrates a cross sectional view of the top coat layer shown in FIG. 2B, in accordance with various embodiments of the present teachings.

FIG. 2A is an isometric view of the exemplary media vacuum transport system 100 shown in FIG. 1, according to various embodiments of the present teachings. FIG. 2B schematically illustrates a cross section of the exemplary transport member 220 shown in FIG. 2A, according to various embodiments of the present teachings. As shown in FIGS. 2A and 2B, the media vacuum transport system 200 can include a transport member 220 which can be entrained about two or more rollers 215, 217 and configured to rotate around the vacuum plenum 210. In various embodiments, the transport member 220 can include a substrate 222 having a plurality of holes 224 extending from a first side 221 proximate to the vacuum plenum 210 to a second side 225 opposite the first side 221 and proximate to a media (not shown). The number, size and arrangement of the plurality of holes 224 can vary as known in the art to efficiently acquire various types of media. In some embodiments, the plurality of holes 224 can have a size ranging from about 0.2 mm to about 2.0 mm or from about 0.3 mm to about 1.8 mm or from about 0.4 mm to about 1.5 mm. The transport member 220 can also include a top coat layer 226 disposed over the substrate 222. In various embodiments, the top coat layer 226 can include a plurality of particles 227 dispersed in a resin 228 to provide an average surface roughness Ra of about 2 µm to about 100 µm or from about 5 µm to about 75 µm or from 8 µm to about 50 µm. In certain embodiments, the top coat layer 226 can include a plurality of particles 227 dispersed in a polymer blend 228', as shown in FIG. 2C. Furthermore, as shown in FIG. 2C, it is the plurality of particles that account for the roughness of the top coat layer. In various embodiments, the roughness can have uniform spatial frequency and can depend on various factors, such as, for example, desired media flatness level, the belt thickness, the available vacuum pressure, etc. The spatial distribution of the roughness of the top coat layer 226 can be in accordance with the application. For applications that require very small gaps in the order of a few hundred microns, the roughness must have only high spatial frequencies (small wavelengths) because low spatial frequencies (large wavelengths) can result in gap variations. However, very high spatial frequency can result in a decrease in the air flow within the gap which, in turn, can result in a decrease in the vacuum pressure.

As used herein, the term media refers to any suitable material such as plain paper, coated paper, no tear paper, wood, plastics, fabrics, textile products, polymeric films, inorganic substrates such as metals, glass, ceramics, and the like. The paper can include, for example, plain papers such as XEROX® 4024 papers, ruled notebook paper, bond paper, silica coated papers such as Sharp Company silica coated paper, Jujo paper, and the like. The polymeric films can include, for example, polyethylene, polyethylene terephtalate, polyethylene naphthalate, polystyrene, polycarbonate, and polyethersulfone.

In certain embodiments, the plurality of particles 227 can include a plurality of hollow micro spherical particles. In various embodiments, each of the plurality of particles 227 can have a diameter in the range of about 1 µm to about 100 µm or from about 5 µm to about 80 µm or from 15 µm to about 50 μm. Each of the plurality of particles 227 can include any suitable material, such as, for example, silicone, glass, metal, and ceramic. In certain embodiments, each of the plurality of particles 227 can include, but is not limited to, soda-lime-borosilicate glass, silica-alumina ceramic, silica, alumina, or any other ceramic. Exemplary particles 227 can include, but are not limited to, Tospearl 1110A, about 11 mm micro spherical cross-linked siloxane particles (Momentive Performance Materials, Albany, N.Y.); 3M™ Zeeosphere™ G-200 and W610 silica-alumina hollow spherical balls (3M Specialty Materials, St. Paul, Minn.); and 3M™ A20/1000 glass bubbles (3M Energy and Advanced Materials Division, St. Paul, Minn.).

In various embodiments, the plurality of particles 227 can be present in the resin 228 and in the polymer blend 228' in an amount ranging, for example, from about 1% to about 40% or from about 2% to about 30% or about 5% to about 20% by weight of the total solid weight of the top coat layer 226 composition. Any suitable material can be used for the resin 228 and for the polymer blend 228', such as, for example, ethylene-vinyl acetate copolymer, styrene-butadiene copolymer, polyethylene, polyvinyl chloride, polyvinylidene chloride, polyoxymethylene, polypropylene, polybutylene, polycarbonate, polyester, polyarylate, terephthalic acid resin, and the like. Exemplary materials for the resin 228 and for the polymer blend 228' can include, but are not limited to, PCZ 400 (Mitsubishi Gas Chemical Company, Tokyo, UP) and Levapren® 450 EVA copolymer (Lanxess Corporation, Pittsburgh, Pa.).

In various embodiments, the top coat layer 226 can further include one or more additives such as, for example, electrically conductive fillers, thermally conductive fillers, thermally stabilizing agents, coloring agents, reinforcing fillers, surfactants, cross-linking agents, leveling agents, and processing aids. Exemplary electrically conductive fillers can include, but are not limited to, carbon black (Cabot Corporation, Boston, Mass.), graphene, carbon nanotubes, silver, copper or any metal particles, titanium oxide, zinc oxides, or any metal oxides.

In some embodiments, an adhesive layer (not shown) can be disposed between the substrate 222 and the top coat layer 226. Any suitable material can be used for the adhesive layer, such as, for example, polyarylate, polyurethance, polyolefin, phenolic resin, and the like.

Referring back to FIG. 2A, the vacuum plenum 210 can be actuated by a motor (not shown) and thereby can draw air through the holes 224 in the transport member 220 particularly in the area where a media (not shown) moving in a process direction is passing over the transport member 220. In this way, the vacuum plenum 210 can hold a media against the second side 225 of the transport member 220, while the transport member 220 moves that sheet for example, from photoreceptor 102 towards the nip of fuser rolls 104, as shown in FIG. 1.

While not intending to be bound by any specific theory, it is believed that the top coat layer 226 can spread the vacuum between the holes 224 to provide substantially uniform suction force distributed substantially throughout the media that need to be held and/or transported. The roughness of the top coat layer 226 can result in an elevation of the media above the holes 224, allowing for air to flow within the gap which, in turn, can distribute the vacuum pressure over a larger area and can prevent the media from "sealing-off" the applied suction force. Furthermore, the vacuum pressure over the larger area can increase the media hold down force for the same amount of vacuum pressure. This higher media hold down force is especially important in areas where the media profile height and/or accurate acquisitions are required, such as, for example in direct marking systems. Also, the higher media hold down loads can result in reduction of cost due to the need for lower vacuum pressure.

Figure 3:
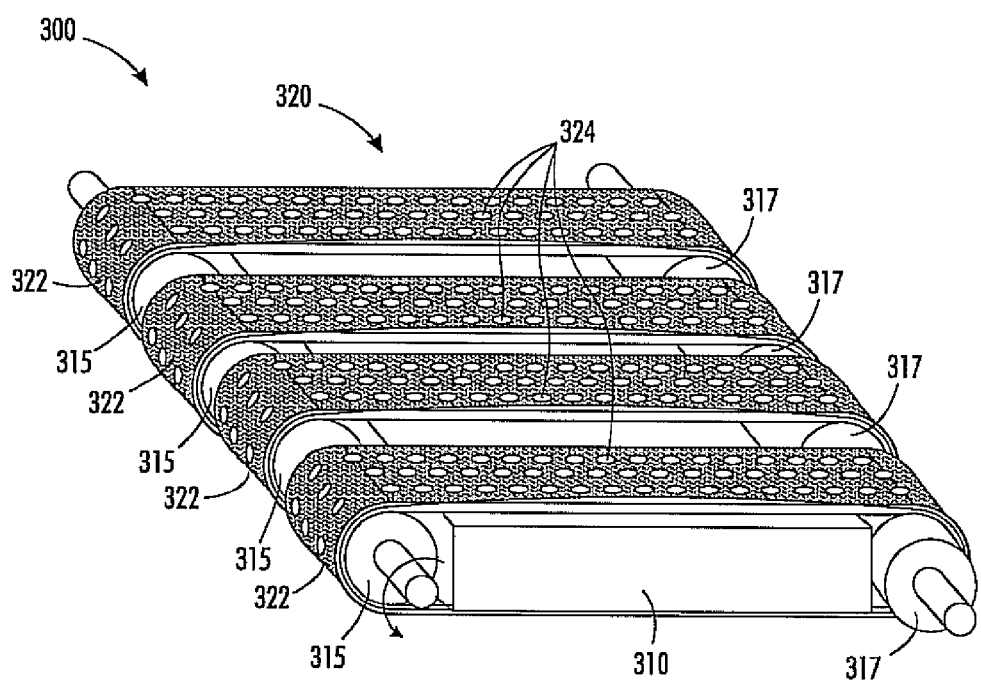
FIG. 3 is an isometric view of another exemplary media vacuum transport system, according to various embodiments of the present teachings, according to various embodiments of the present teachings.

FIG. 3 is an isometric view of another exemplary media vacuum transport system 300, according to various embodiments of the present teachings, according to various embodiments of the present teachings. The media vacuum transport system 300 can include a plurality of transport members 320, which can be entrained about two or more rollers 315, 317 and configured to rotate around the vacuum plenum 310. Each of the plurality of transport members 320 can include a substrate 322 having a plurality of holes 324 extending from a first side proximate to the vacuum plenum 310 to a second side opposite the first side and proximate to a media (not shown). The one or more transport members 320 can also include a top coat layer disposed over the substrate 322, for example the top coat layer 226 disposed over the second side 225 of the substrate 222, as shown in FIG. 2B. In some embodiments, the top coat layer 226 can include a plurality of particles 227 dispersed in a resin 228. In other embodiments, the top coat layer 226 can include a plurality of particles 227 dispersed in a polymer blend 228', as shown in FIG. 2C. The vacuum plenum 310 can be actuated by a motor (not shown) and thereby can draw air through the holes 324 in the one or more transport members 320 particularly in the area where a media (not shown) moving in a process direction in is passing over the one or more transport members 320.

In some embodiments, the one or more transport members 220, 320 can be a belt. In other embodiments, the one or more transport members 220, 320 can be a cylindrical drum. In various embodiments, the substrate 222, 322 can include materials, such as, for example, polyethylene terephthalate (PET), polyethylene naphthalene (PEN), polysulfone (PS), polyimide (PI), polyamideimide (PAI), polyetherimide (PEI), and the like. In other embodiments, the substrate 222, 322 can be a metal substrate, such as, for example, steel, iron, and aluminum.

Figure 4:
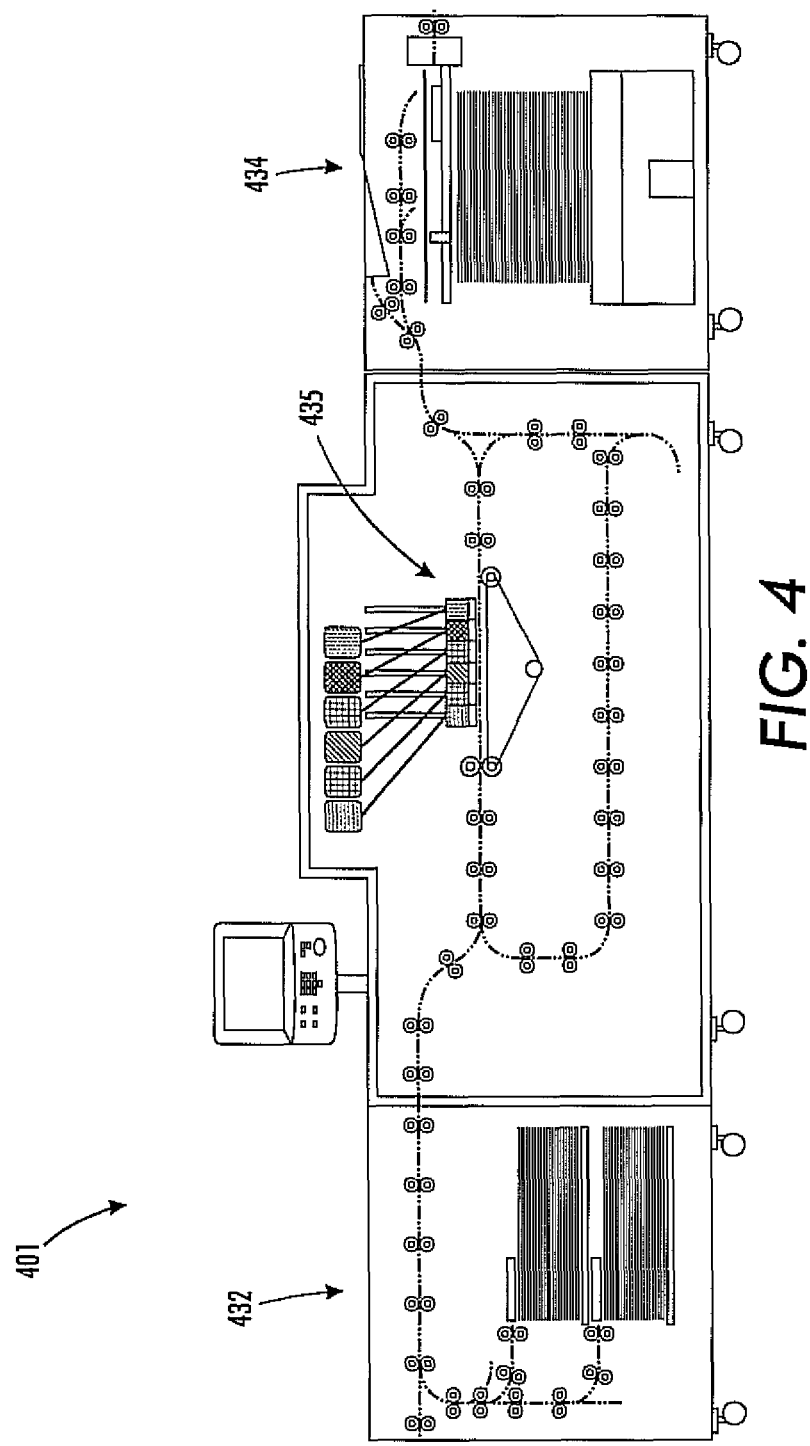
FIG. 4 schematically illustrates an exemplary direct to paper printing architecture, according to various embodiments of the present teachings.

FIG. 4 schematically illustrates an exemplary direct to paper printing architecture 401, according to various embodiments of the present teachings. The direct to paper printing architecture 401 can include a media feeder assembly 432 providing media to the media transport system 400. The media transport system 400 can be disposed under an ink-jet print head assembly 435, where media can be held while being printed on to followed by transport to the finisher 434. In various embodiments, the media transport system 400 can include one or more transport members, such as, for example, the transport member 220, as shown in FIG. 2B, the one or more transport members 220 having a top coat layer 226 disposed over the second side 225 of the substrate 222, as shown in FIG. 2B. In some embodiments, the top coat layer 226 can include a plurality of particles 227 dispersed in a resin 228. In other embodiments, the top coat layer 226 can include a plurality of particles 227 dispersed in a polymer blend 228', as shown in FIG. 2C.

Figure 5:
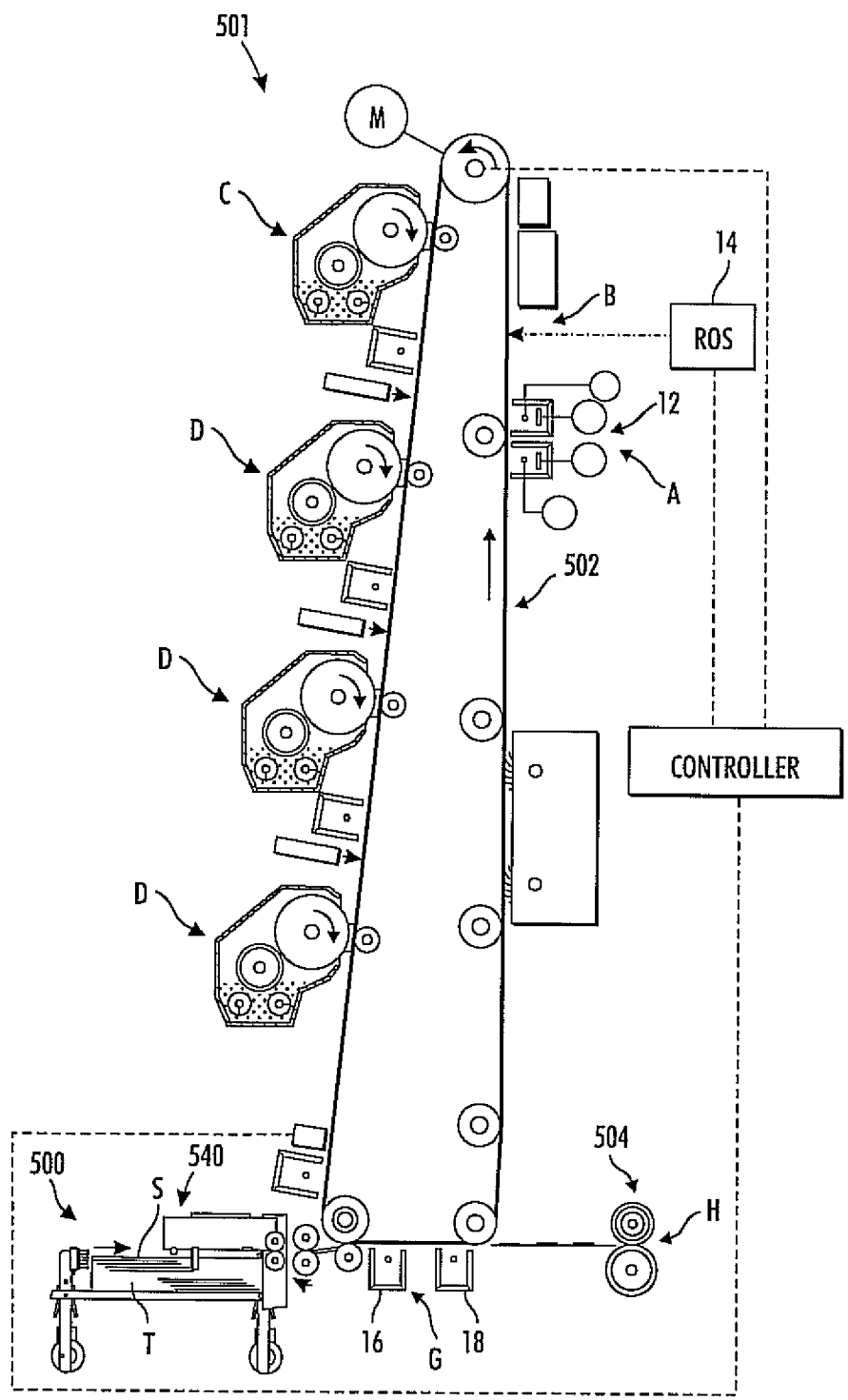
FIG. 5 schematically illustrates an exemplary full color image-on-image single pass electrophotographic printing apparatus, according to various embodiments of the present teachings.

FIG. 5 schematically illustrates an exemplary full color image-on-image single pass electrophotographic printing apparatus 501, according to various embodiments of the present teachings. In the exemplary printing apparatus 501 or reproduction machine, as shown in FIG. 1, a photoconductive member or belt 502 can be charged at a charging station A to a substantially uniform potential so as to sensitize the surface thereof. At a station B, the charged portion of the photoconductive member 502 can be exposed to a light image of an original document being reproduced obtained from a scanning device, such as a raster output scanner 14. Exposure of the charged photoconductive member 502 can selectively dissipate the charges thereon in the irradiated areas thereby recording an electrostatic latent image on the photoconductive member 502 corresponding to the informational areas contained within the original document. After the electrostatic latent image is recorded on the photoconductive member 502, the latent image can be developed by bringing a developer material into contact therewith at a series of developer stations C and D. Generally, the developer material can include toner particles adhering triboelectrically to carrier granules. The toner particles can be attracted from the carrier granules to the latent image forming a toner powder image on the photoconductive member 502. The toner powder image can then be transferred from the photoconductive member 502 to a media. The toner particles can then be heated to permanently affix the powder image to the media. For a typical black and white electro-photographic printing machine, a single development station C may be provided. On the other hand, with the advent of multicolor electrophotography, multiple additional development stations D may be provided that fix color toner to the photoconductive member 502.

Subsequent to image development, a sheet S of support material can be moved using a sheet feeder apparatus 500 into contact with the toner images at a transfer station G. At the transfer station G, a transfer dicorotron 16 can spray positive ions onto the backside of the sheet S which thereby attracts the negatively charged toner particle images from the photoreceptor 502 to the sheet S. A detack corotron 18 can be provided for facilitating stripping of the sheet S from the surface of the photoreceptor 502. After transfer, the sheet S can travel to a fusing station H where a heated fuser roller assembly 504 can permanently affix the toner powder to the sheet S.

Figure 6:
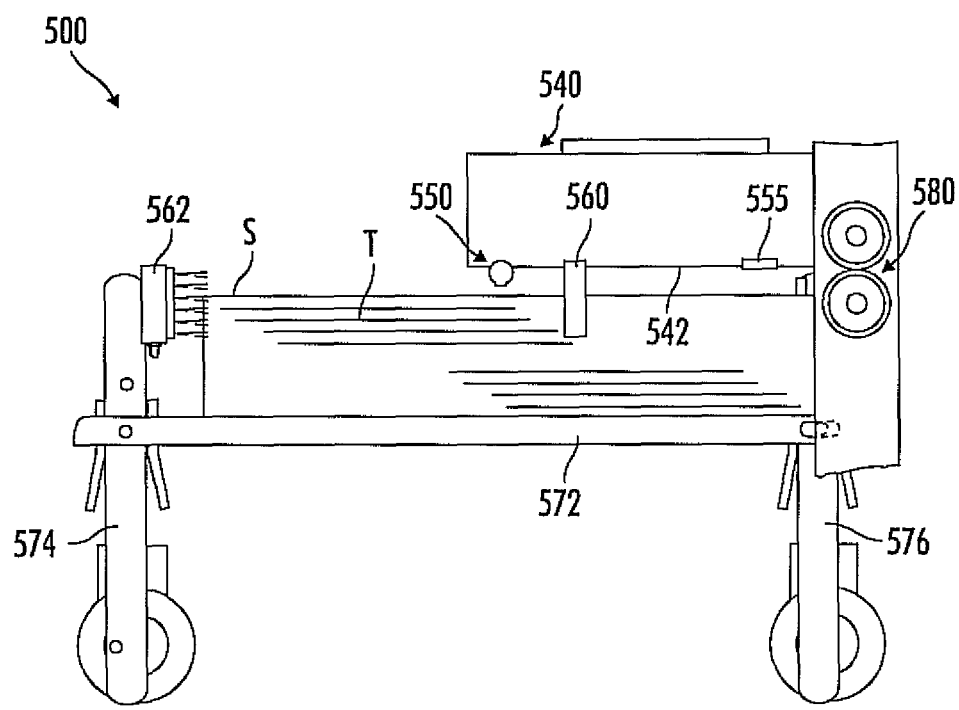
FIG. 6 shows a schematic illustration of a side view of an exemplary sheet feeder apparatus incorporated into the printing apparatus of FIG. 5, according to various embodiments of the present teachings.

Referring back to the sheet feeder apparatus 500, FIG. 6 shows a side elevational view of the exemplary sheet feeder apparatus 500, according to various embodiments of the present teachings. The basic components of the sheet feeder apparatus 500 can include a sheet support tray 572, which may be tiltable and self adjusting to accommodate various sheet types and characteristics; multiple tray elevator mechanisms 574, 576; a vacuum shuttle feedhead 540; a lead edge multiple range sheet height sensor 555; a multiple position stack height sensor 550; a variable acceleration take away roll (TAR) 580; inboard and outboard sheet fluffers 560, and trail edge fluffer 562. The feedhead 540 shown in FIGS. 5 and 6 can be a top vacuum corrugation feeder (VCF), so distance control of the top sheets in the stack T from the acquisition surface 542 and the fluffer jets 560 and 562 can be important. The acquisition surface 542 is the functional surface on the feedhead 540 or vacuum plenum. The two sensors 550, 555 together enable the paper supply to position the stack T. The multi-position stack height sensor 550 contacts the sheet stack T to detect two or more specific stack heights. This sensor 550 works in conjunction with the second sensor 555 near the stack lead edge which also senses the distance to the top sheet, but without sheet contact. The two sensors together enable the paper supply to position the stack T with respect to an acquisition surface 542 of the feedhead 540, both vertically and angularly in the process direction. This height and attitude control greatly improves the capability of the feeder 500 to cope with a wide range of paper basis weight, type, and curl.

The feedhead 540 can acquire individual sheet S of media (using vacuum) from the top of a stack T and transports it forward to the TAR 580. The feedhead 540 can also include a vacuum source (not shown), the vacuum source being selectively actuatable to acquire and release the top sheet S from the stack T.

Figure 7:
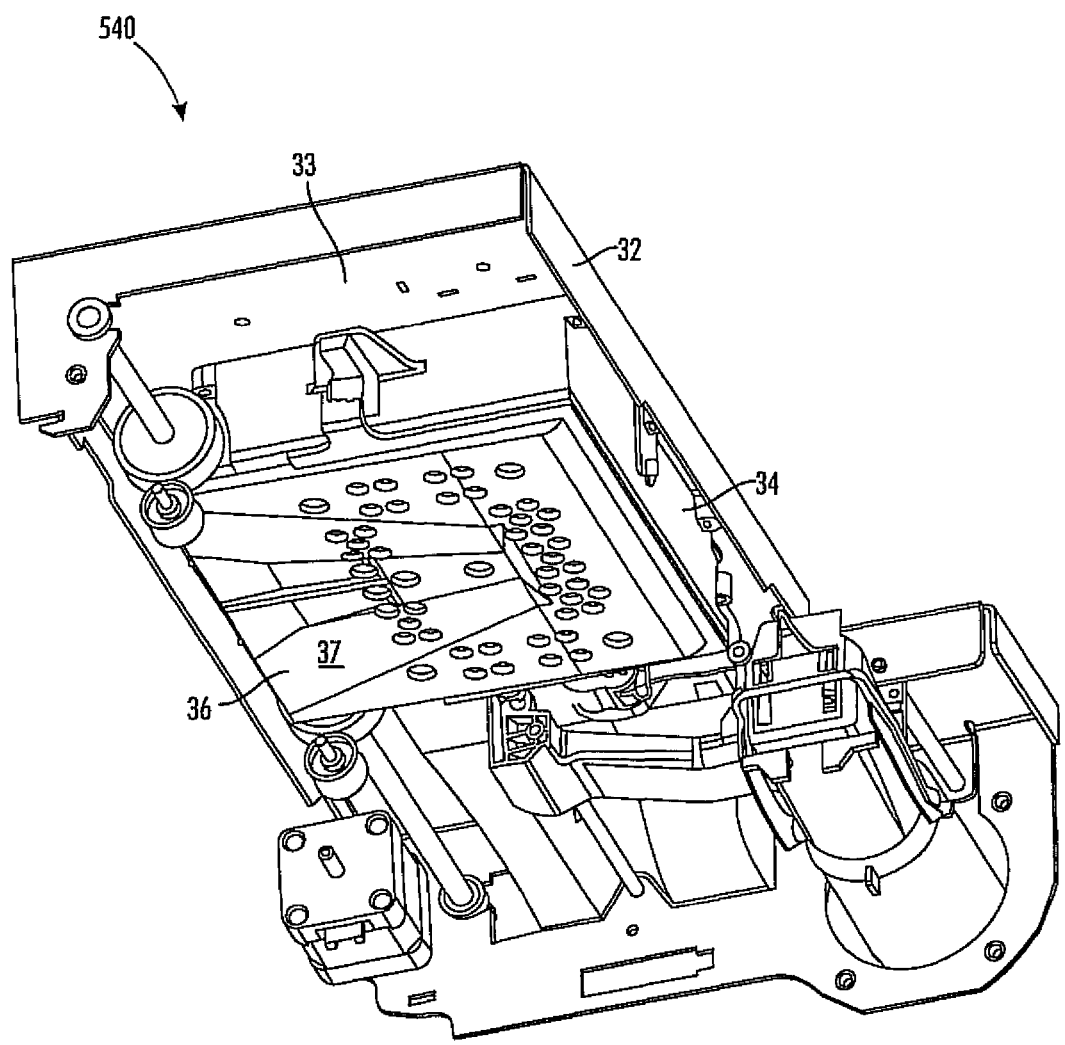
FIG. 7 is a bottom perspective of an exemplary feedhead shown in FIG. 6, in accordance with various embodiments of the present teachings.

FIG. 7 is a bottom perspective of the exemplary feedhead 540 shown in FIG. 6. The feedhead 540 can include a frame 32 that supports the components of the assembly within a particular machine. A plenum 34 can be supported on the underside of a top plate 33 of the frame 32 in communication with a vacuum duct (not shown). The feedhead 540 can also include a slide plate 36 that closes the lower opening of the plenum 34, as shown in FIG. 7. The slide plate 36 can include a plurality of apertures 38 through which the vacuum or suction can be applied to engage a sheet S and an acquisition surface 37 arranged to face the sheet S to be acquired and conveyed. The acquisition surface 37 can also include a top coat layer disposed over a substrate, for example the top coat layer 226 disposed over the second side 225 of the substrate 222, as shown in FIG. 2B. In some embodiments, the top coat layer 226 can include a plurality of particles 227 dispersed in a resin 228. In other embodiments, the top coat layer 226 can include a plurality of particles 227 dispersed in a polymer blend 228', as shown in FIG. 2C. U.S. Pat. No. 7,258,336 discloses in detail the sheet feeder apparatus 500 and feedhead 540, the disclosure of which is incorporated by reference herein in their entirety.

The use of one or more transport members having a surface roughness can enhance vacuum pressure distribution in a media vacuum transport system, such as for example, vacuum transport system 100, 200 shown in FIGS. 1 and 2 and sheet feeder apparatus 500, shown in FIGS. 5 and 6.

Figure 8:
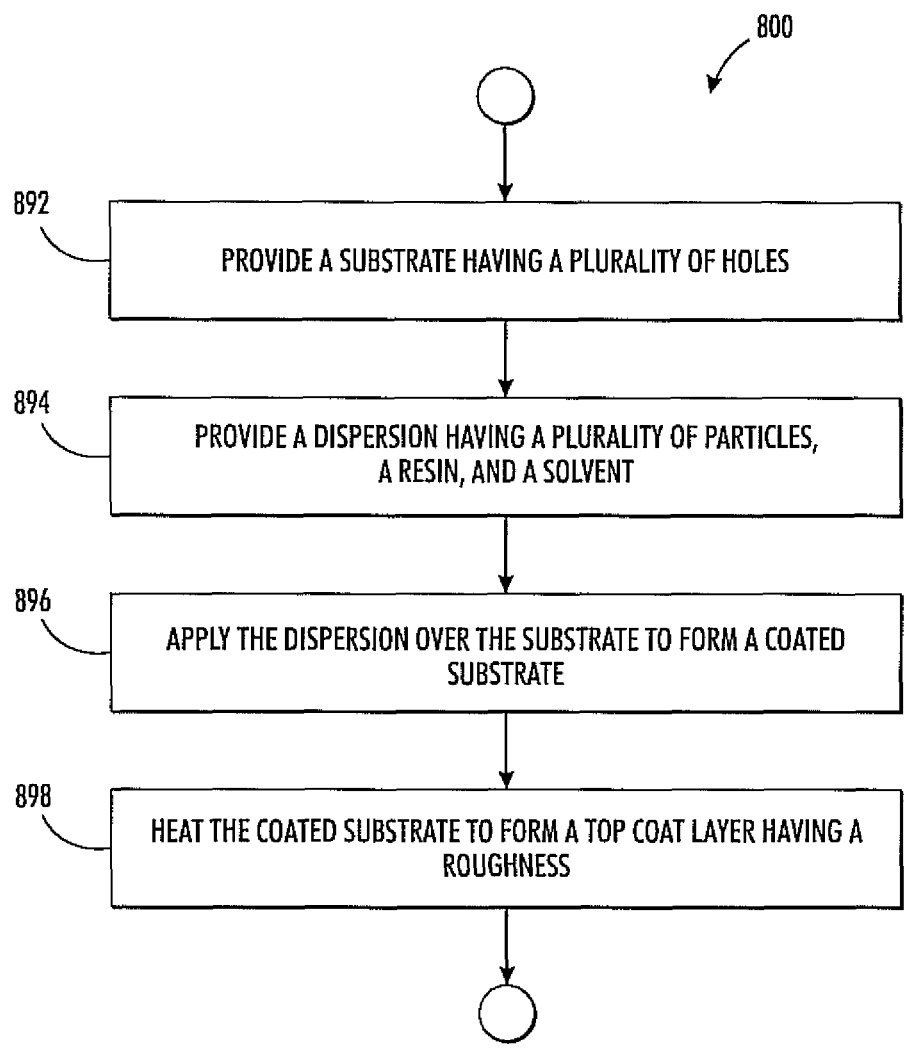
FIG. 8 shows an exemplary method of making a media vacuum transport member, according to various embodiments of the present teachings.

According to various embodiments, FIG. 8 shows a method 800 for making a media vacuum transport member, such as for example, media vacuum transport member 220, 320 as shown in FIGS. 2A, 2B and 3. The method 800 can include a step 892 of providing a substrate, for example the substrate 222 including a plurality of holes 224 extending from a first side 221 proximate to the vacuum plenum 210 to a second side 225 opposite the first side 221 and proximate to a media (not shown) as shown in FIG. 2B. Any suitable method can be used for forming the plurality of holes, such as, for example, laser drilling. The method 800 can also include a step 894 of providing a dispersion including a plurality of particles, a resin, and a solvent. In some embodiments, the dispersion can also include additives, such as, for example, electrically conductive fillers, thermally conductive fillers, thermally stabilizing agents, coloring agents, reinforcing fillers, surfactants, cross-linking agents, leveling agents, and processing aids. The method 800 can also include a step 896 of applying the dispersion over the second side of the substrate to form a coated substrate and a step 898 of heating the coated substrate to form a top coat layer such as, for example, the top coat layer 226 over the second side 225 of the substrate 222, as shown in FIG. 2B. In various embodiments, the top coat layer can have an average surface roughness Ra of about 2 μm to about 100 μm or from about 5 μm to about 75 μm or from 8 μm to about 50 μm.

Figure 10:
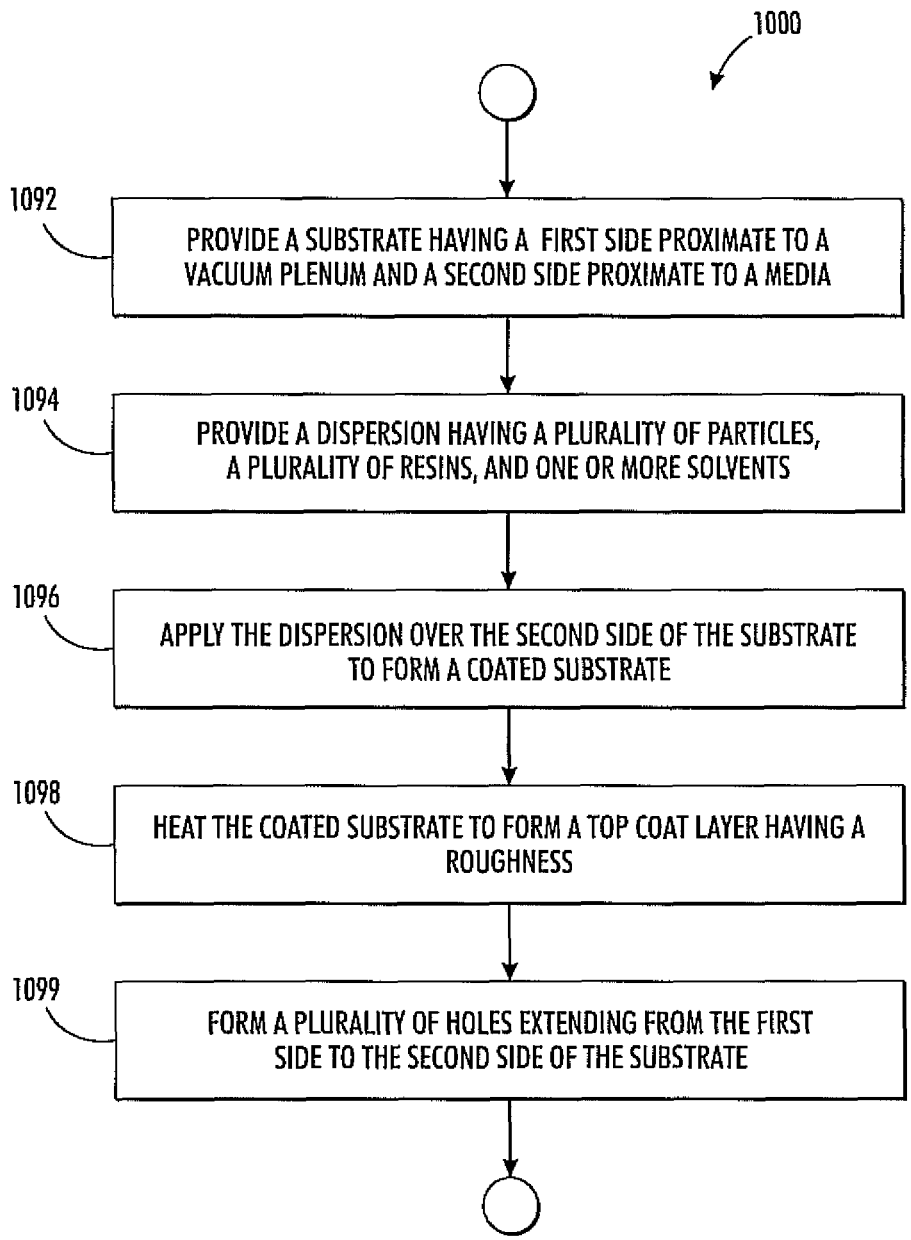
FIG. 10 shows another exemplary method of making a media vacuum transport member, according to various embodiments of the present teachings.

FIG. 10 shows another exemplary method 1000 for making a media vacuum transport member, such as for example, media vacuum transport member 220, 320 as shown in FIGS. 2A, 2B, 2C, and 3, in accordance with various embodiments of the present teachings. The method 1000 can include a step 1092 of providing a substrate, for example the substrate 222 including a first side 221 proximate to a vacuum plenum 210 and a second side 225 proximate to a media (not shown) as shown in FIG. 2B. The method 1000 can also include a step 1094 of providing a dispersion including a plurality of particles, two or more polymers/resins, and one or more solvents.

In some embodiments, the plurality of particles can include a plurality of hollow micro spherical particles having a size in the range of about 1 µm to about 100 µm or from about 5 µm to about 80 µm or from 15 µm to about 50 µm. In various embodiments, the plurality of particles can include one or more of silicone, glass, metal, and ceramic. The two or more polymers/resins can include ethylene-vinyl acetate copolymer, styrene-butadiene copolymer, polyethylene, polyvinyl chloride, polyvinylidene chloride, polyoxymethylene, polypropylene, polybutylene, polycarbonate, polyester, polyarylate, terephthalic acid resin, and the like. In some embodiments, the dispersion can also include additives, such as, for example, electrically conductive fillers, thermally conductive fillers, thermally stabilizing agents, coloring agents, reinforcing fillers, surfactants, cross-linking agents, leveling agents, and processing aids. The method 1000 can also include a step 1096 of applying the dispersion over the second side of the substrate to form a coated substrate using any suitable coating technique, including, but not limited to, draw bar coating, spray coating, dip coating, brush coating, roller coating, spin coating, casting, and flow coating. In some embodiments, an adhesive layer can be deposited over the substrate before the step of applying the dispersion over the substrate.

The method 1000 can further include a step 1098 of heating the coated substrate to form a top coat layer such as for example the top coat layer 226 over the second side 225 of the substrate 222, as shown in FIG. 2B. In various embodiments, the top coat layer can have an average surface roughness Ra of about 2 µm to about 100 µm or from about 5 µm to about 75 µm or from about 8 µm to about 50 µm. The method 1000 can also include a step 1099 of forming a plurality of holes extending from the first side of the substrate to the second side of the substrate and the top coat layer. Any suitable method can be used for forming the plurality of holes, such as, for example, laser drilling. In various embodiments, the plurality of holes 224 can have a size ranging from about 0.2 mm to about 2.0 mm or from about 0.3 mm to about 1.8 mm or from about 0.4 mm to about 1.5 mm.

According to some embodiments, there is a method of transporting a media. The method can include providing one or more transport members configured to rotate around a vacuum plenum, such as for example, vacuum transport member 220, 220', 320 as shown in FIGS. 2A, 2B, 2C, and 3. In various embodiments, at least one of the one or more transport members can include a substrate 222, the substrate 222 having a first side 221 proximate to the vacuum plenum 210 and a second side 225 opposite the first side and proximate to the media to be held and/or transported and a top coat layer 226 disposed over the substrate 222, wherein the top coat layer 226 can include a plurality of particles 227 dispersed in a resin 228 to provide an average surface roughness Ra of about 2 µm to about 100 µm or from about 5 µm to about 75 µm or from 8 µm to about 50 µm. In some embodiments, the top coat layer 226 can include a plurality of particles 227 dispersed in a polymer blend 228', as shown in FIG. 2C. The method can also include disposing the media over the top coat layer 226 of the one or more transport members 220. The method can further include holding onto the media by applying vacuum through the holes 224 of the substrate 222 to generate a suction force, wherein the textured surface can distribute the suction force substantially uniformly between the textured surface of the top coat layer 226 and the media. As used herein the term "suction force" refers to the vacuum suction force, created by the application of vacuum through the holes 224 of the substrate 222. In a smooth substrate without any roughness, the suction force is localized around the holes 224. However, roughness lifts the media above the holes 224 and provides pathways for air circulation and hence for substantially uniform distribution of suction. The method can also include transporting the media by rotating the one or more transport members 220 around the vacuum plenum 210.

Examples are set forth herein below and are illustrative of different amounts and types of reactants and reaction conditions that can be utilized in practicing the disclosure. It will be apparent, however, that the disclosure can be practiced with other amounts and types of reactants and reaction conditions than those used in the examples, and the resulting devices various different properties and uses in accordance with the disclosure above and as pointed out hereinafter.

EXAMPLES

Example 1

Preparation of Coating Dispersions

A first dispersion A was formed by adding about 100 g of polycarbonate, PCZ-400 (Mitsubishi Gas Chemical Company, Tokyo, JP); about 3 g of carbon black (Cabot Corporation, Boston, Mass.); and about 32 g of 3M™ A20/1000 glass bubbles (3M Energy and Advanced Materials Division, St. Paul, Minn.) having an average particle size of about 30 µm to about 480 ml of tetrahydrofuran (THF). The resulting dispersion was ball milled for about 24 hours on a roll mill (Fisher Scientific, Pittsburgh, Pa.) to produce stable dispersion A.

A second dispersion B was formed by adding about 100 g of polycarbonate, PCZ-400 (Mitsubishi Gas Chemical Company, Tokyo, JP); about 3 g of carbon black (Cabot Corporation, Boston, Mass.); and about 22 g of 3M™ Zeeosphere™ G-200 silica-alumina hollow spherical balls (3M Specialty Materials, St. Paul, Minn.) having an average particle size in the range of about 2 µm to about 10 µm to about 480 ml of tetrahydrofuran (THF). The resulting dispersion was ball milled for about 24 hours on a roll mill (Fisher Scientific, Pittsburgh, Pa.) to produce stable dispersion B.

Example 2

Preparation of Rough Surface Belts

The coating dispersions A and B of Example 1 were each draw bar coated on a polyethylene naphthalene (PEN) substrate having a size of about 8"×12"×20" and a plurality of holes having a diameter of about 0.5 mm were laser drilled. The resulting coated substrate was dried in an oven at about 130° C. for about 10 minutes. Table 1 summarizes the composition and roughness of the two resulting rough surface belts.

TABLE 1

| Sample | Top coat layer composition (in weight ratio) | Particle size (µm) | Top coat layer thickness (µm) | Top coat layer Roughness, Ra (µm) |
|---|---|---|---|---|
| A | PCZ400/A20/1000/CB (77/21/2) | 30 | 42.7 | 14.9 |
| B | PCZ400/G-200/CB (69/29/2) | 6 | 24.7 | 2.2 |

Example 3

Effect of Belt Roughness on the Resulting Vacuum Pressure Distribution

Figure 9A:
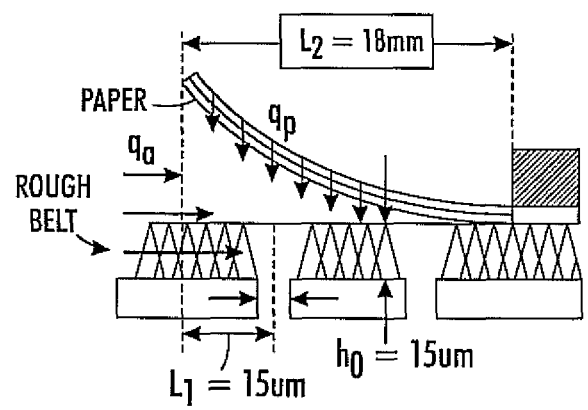
FIGS. 9A and 9B schematically illustrate a side view and a top view respectively of an exemplary embodiment used to study the effect of belt roughness on the resulting vacuum pressure distribution.
Figure 9B:
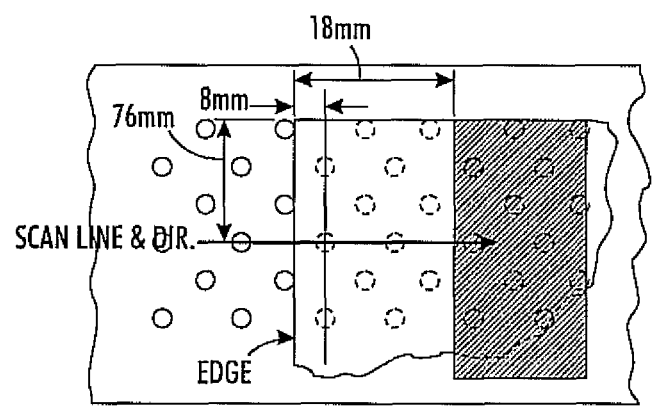
Figure 9C:
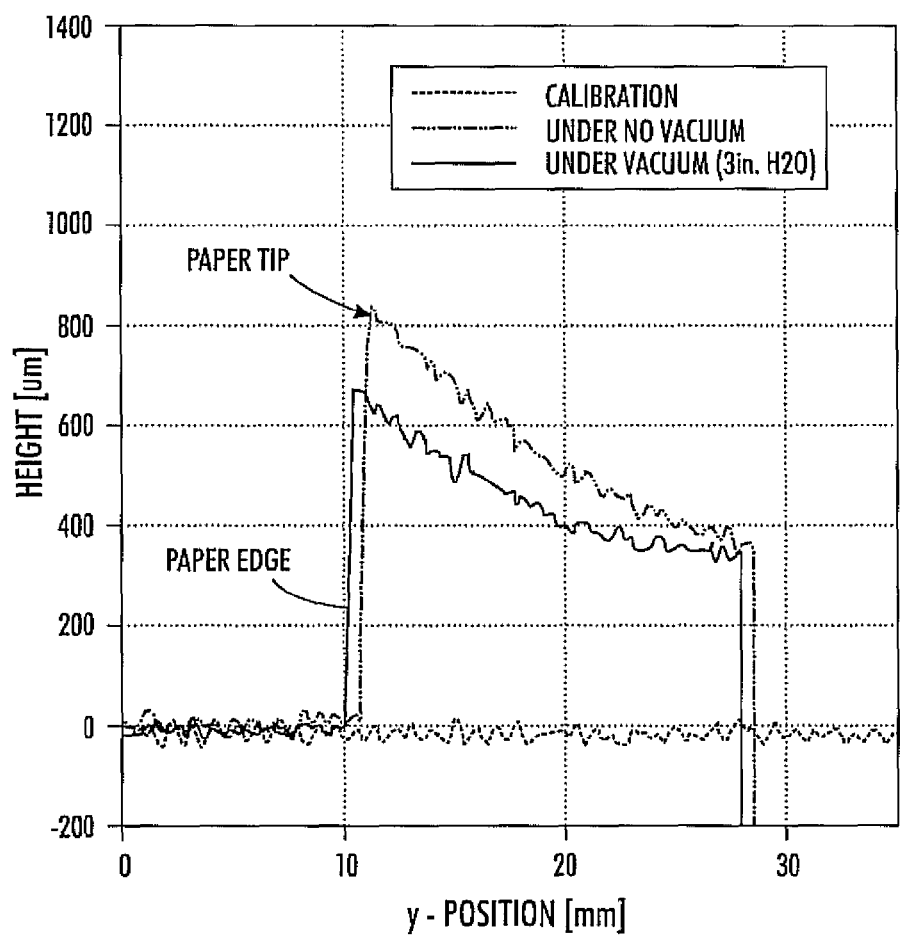
FIG. 9C shows a graph showing the effect of vacuum pressure on paper tip height for the exemplary embodiment shown in FIGS. 9A and 9B.

FIGS. 9A and 9B schematically illustrate a side view and a top view respectively of an exemplary embodiment used to study the effect of belt roughness on the resulting vacuum pressure distribution. As shown in FIG. 9A, up-curled paper was used (300 gsm or 110# and initial laying curl of 4 mm). Additionally, a steel plate was used to simulate a tangency point at a distance of about 18 mm from the edge and a vacuum hole at about 6 mm from the edge. In FIG. 9A, $q_p$ and $q_a$ represent the air flow vectors through the paper and the ambient gap, respectively. First, the belt surface (with no paper) was scanned with a displacement sensor LK-031/LK-2001 (KEYENCE CORPORATION OF AMERICA, Woodcliff Lake, N.J.) as a calibration step. Then a pre-curled paper (300 gsm, 110#, C2S and initial laying curl of 4 mm) was disposed on the belt surface and aligned to desired orientation. The paper was then scanned with belt with no vacuum. FIG. 9C shows the no vacuum curve (dotted line). Then, the vacuum was activated and the paper was rescanned to see the effect of vacuum, as shown by the vacuum curve (dashed line). The process was repeated for two rough belt surfaces of Example 2. Table 1 summarizes the effect of pressure on the vacuum distribution.

TABLE 1

| Run | Sample | Roughness gap (µm) | Vacuum Pressure (In. H$_2$O) | Tip height with no vacuum (µm) | Tip height with vacuum (µm) | Paper tip displacement (µm) |
|---|---|---|---|---|---|---|
| 1 | A | 15 | 3 | 800 | 680 | 120 |
| 2 | A | 15 | 6 | 800 | 580 | 220 |
| 3 | B | 2 | 3 | 800 | 790 | 10 |
| 4 | B | 2 | 6 | 800 | 630 | 170 |

As summarized in Table 1, comparing Run 1 with Run 3, i.e. the belt A having a roughness of about 15 µm with the belt B having a roughness of about 2 µm at a vacuum pressure of about 3 In.H$_2$O, it can be concluded that the belt with higher roughness (about 15 µm) has a more pronounced effect on the paper tip displacement or change in tip height. This indicates that under the same conditions of media and pressure there is a better pressure distribution and overall performance with the rougher material. Furthermore, comparing Run 4 with Run 1, the data indicates that higher vacuum pressure is required with the smoother surface (about 2 µm) to achieve roughly the same paper tip displacement as compared with a rougher surface (about 15 µm). In other words, for the same vacuum pressure a smaller blower maybe required with a rough substrate.

Example 4

Preparation of Coating Dispersions

A dispersion was formed by adding about 16.02 g of mixture including about 15% by weight of polycarbonate, PCZ-400 (Mitsubishi Gas Chemical Company, Tokyo, JP); 63% by weight of Levapren® 450 EVA copolymer (Lanxess Corporation, Pittsburgh, Pa.); about 2% by weight of Vulcan XC72 carbon black (Cabot Corporation, Boston, Mass.); and about 20% by weight of 3M™ A20/1000 glass bubbles (3M Energy and Advanced Materials Division, St. Paul, Minn.) having an average particle size of about 30 µm to about 64.08 g of about 70:30 mixture of toluene:tetrahydrofuran (THF) by weight. The resulting dispersion was ball milled using ⅛" stainless steel shot for about 2 hours on a roll mill (Fisher Scientific, Pittsburgh, Pa.) and then was filtered through a cotton-tip filter to produce a stable dispersion.

Example 5

Preparation of Rough Surface Belts

Using about 0.010" bird bar, the coating dispersion of Example 4 was draw bar coated on a polyethylene terephthalate (PET) substrate having a thickness of about 100 µm. The coated substrate was air dried for a few minutes before being placed in an oven at about 100° C. for about 3 minutes. The average film thickness was about 61.5 µm.

The sample roughness was determined by profilometry using a 2 µm contact diamond probe over a distance of about 25 mm. The average surface of the coated substrate was determined to be about 15 µm.

Cross sectional light microscopy of the coated substrate showed a uniform distribution of the material with no areas void of coating on the PET substrate. Furthermore, the coating was found to have good adhesion to the PET substrate.

While the present teachings have been illustrated with respect to one or more implementations, alterations and/or modifications can be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising." As used herein, the term "one or more of" with respect to a listing of items such as, for example, A and B, means A alone, B alone, or A and B. The term "at least one of" is used to mean one or more of the listed items can be selected.

Other embodiments of the present teachings will be apparent to those skilled in the art from consideration of the specification and practice of the present teachings disclosed herein. It is intended that the specification and examples be considered as exemplary only, with a true scope and spirit of the present teachings being indicated by the following claims.

What is claimed is:

1. A media vacuum transport system comprising:
   a vacuum plenum;
   one or more transport members configured to rotate around the vacuum plenum, wherein at least one of the one or more transport members comprises:
   a substrate, the substrate comprising a plurality of holes extending from a first side proximate to the vacuum plenum to a second side opposite the first side, and
   a top coat layer disposed over the substrate, the top coat layer comprising a plurality of particles in a polymer blend, the particles being dispersed throughout substantially the entire thickness of the top coat layer, the particles having a size ranging from 2 µm to about 100 µm for providing a desired surface roughness, an average particle size of the particles being smaller than an average thickness of the top coat layer, the polymer blend comprising two or more polymers selected from the group consisting of ethylene-vinyl acetate copolymer, styrene-butadiene copolymer, polyethylene, polyvinyl chloride, polyvinylidene chloride, polyoxymethylene, polypropylene, polybutylene, polycarbonate, polyester, polyarylate, and terephthalic acid resin, wherein the top coat layer has an average surface roughness Ra of about 2 μm to about 100 μm.

2. The media vacuum transport system of claim 1, wherein the plurality of particles comprises a plurality of hollow micro spherical particles.

3. The media vacuum transport system of claim 1, wherein each of the plurality of particles has a diameter in the range of about 5 μm to about 100 μm.

4. The media vacuum transport system of claim 1, wherein the plurality of particles comprises a plurality of one or more of silicone, glass, metal, and ceramic.

5. The media vacuum transport system of claim 1, wherein each of the plurality of particles comprises at least one of soda-lime-borosilicate glass, silica-alumina ceramic, silica, and alumina.

6. The media vacuum transport system of claim 1, wherein the plurality of particles are present in an amount ranging from about 1% to about 40% by weight of the total solid weight of the top coat layer composition.

7. The media vacuum transport system of claim 1 further comprising an adhesive layer disposed between the substrate and the top coat layer.

8. The media vacuum transport system of claim 1, wherein the substrate is selected from the group consisting of polyethylene terephthalate (PET), polyethylene naphthalene (PEN), polysulfone (PS), polyimide (PI), polyamideimide (PAI), and polyetherimide (PEI).

9. The media vacuum transport system of claim 1, wherein the top coat layer further comprises electrically conductive fillers, the polymer blend comprises polycarbonate and an ethylene-vinyl acetate copolymer, the plurality of particles comprise a plurality of hollow micro spherical particles and the substrate is in the form of an endless belt.

10. The media vacuum transport system of claim 1, wherein the polymer blend covers the particles over substantially the entire roughened surface of the top coat layer.

11. A method of making a media vacuum transport member comprising:

providing a substrate comprising a first side positionable proximate to a vacuum plenum and a second side opposite the first side;

providing a dispersion comprising a continuous phase and a plurality of particles having a size ranging from 2 μm to about 100 μm for providing a desired surface roughness, the continuous phase comprising one or more solvents and two or more polymers selected from the group consisting of ethylene-vinyl acetate copolymer, styrene-butadiene copolymer, polyethylene, polyvinyl chloride, polyvinylidene chloride, polyoxymethylene, polypropylene, polybutylene, polycarbonate, polyester, polyarylate, and terephthalic acid resin, the particles being dispersed throughout the continuous phase;

applying the dispersion over the second side of the substrate to form a coated substrate;

heating the coated substrate to form a top coat layer over the second side of the substrate, wherein the top coat layer provides an average surface roughness Ra of about 2 μm to about 100 μm, the plurality of particles having an average particle size that is smaller than an average thickness of the top coat layer; and forming a plurality of holes extending from the first side of the substrate to the second side of the substrate.

12. The method of making a media vacuum transport member according to claim 11, wherein the step of applying the dispersion over the substrate comprises an application technique selected from the group consisting of draw bar coating, spray coating, dip coating, brush coating, roller coating, spin coating, casting, and flow coating.

13. The method of making a media vacuum transport member according to claim 11 further comprising depositing an adhesive layer over the substrate before the step of applying the dispersion over the substrate.

14. The method of making a media vacuum transport member according to claim 11, wherein the plurality of particles comprises a plurality of hollow micro spherical particles, each of the plurality of particles having a diameter in the range of about 5 μm to about 100 μm.

15. The method of making a media vacuum transport member according to claim 11, wherein the plurality of particles comprises a plurality of one or more of silicone, glass, metal, and ceramic.

16. The method of making a media vacuum transport member according to claim 11, wherein the dispersion further comprises electrically conductive fillers, the polymer blend comprises polycarbonate and an ethylene-vinyl acetate copolymer, the plurality of particles comprise a plurality of hollow micro spherical particles and the substrate is in the form of an endless belt.

17. The method of claim 11, wherein the polymer blend covers the particles over substantially the entire roughened surface of the top coat layer.

18. A method of transporting media comprising:

providing one or more transport members configured to rotate around a vacuum plenum, wherein at least one of the one or more transport members comprises:

a substrate, the substrate comprising a plurality of holes extending from a first side proximate to the vacuum plenum to a second side proximate to a media; and a top coat layer disposed over the substrate, the top coat layer comprising a plurality of particles in a polymer blend, the particles being dispersed throughout substantially the entire thickness of the top coat layer, the particles having a size ranging from 2 μm to about 100 μm for providing a desired surface roughness, an average particle size of the particles being smaller than an average thickness of the top coat layer, the polymer blend comprising two or more polymers selected from the group consisting of ethylene-vinyl acetate copolymer, styrene-butadiene copolymer, polyethylene, polyvinyl chloride, polyvinylidene chloride, polyoxymethylene, polypropylene, polybutylene, polycarbonate, polyester, polyarylate, and terephthalic acid resin, wherein the top coat layer has an average surface roughness Ra of about 2 μm to about 100 μm;

disposing the media over the top coat layer of the one or more transport members;

holding onto the media by applying vacuum through the holes of the substrate to generate a suction force, wherein the textured surface having an average roughness Ra of about 2 μm to about 100 μm distributes the suction force substantially uniformly between the textured surface and the media; and transporting the media by rotating the one or more transport members around the vacuum plenum.

19. The method of claim 18, wherein the step of disposing the media over the top coat layer of the one or more transport members comprises disposing one or more of plain paper, coated paper, no tear paper, wood, plastics, fabrics, textile products, polymeric films, inorganic materials such as metals, glass, and ceramics.

20. The method of claim 18, wherein the top coat layer further comprises electrically conductive fillers, the polymer blend comprises polycarbonate and an ethylene-vinyl acetate copolymer, the plurality of particles comprise a plurality of hollow micro spherical particles and the substrate is in the form of an endless belt.

21. The method of claim 18, wherein the polymer blend covers the particles over substantially the entire roughened surface of the top coat layer.

\* \* \* \* \*